United States Patent [19]
Schoettle et al.

[11] 4,029,268
[45] June 14, 1977

[54] TAPE RECORDER AND MAGNETIC TAPE CASSETTE

[75] Inventors: Klaus Schoettle, Heidelberg; Heinrich Wittkamp, Mannheim; Lothar Gliniorz, Frankenthal; Peter Dobler, Ludwigshafen, all of Germany

[73] Assignee: BASF Aktiengesellschaft, Ludwigshafen (Rhine), Germany

[22] Filed: Sept. 30, 1975

[21] Appl. No.: 618,042

[52] U.S. Cl. .............................. 242/198
[51] Int. Cl.² ........................ G11B 23/10
[58] Field of Search .......... 242/199, 198, 197, 200, 242/210, 71.2; 360/96

[56] References Cited
UNITED STATES PATENTS

| | | | |
|---|---|---|---|
| 2,584,733 | 2/1952 | Owens | 242/198 |
| 3,027,111 | 3/1962 | Redfield | 242/198 |

*Primary Examiner*—George F. Mautz
*Attorney, Agent, or Firm*—Keil, Thompson & Shurtleff

[57] ABSTRACT

The invention relates to a magnetic tape cassette and a tape recorder for use with such a cassette. More specifically, the invention relates to the provision of movable holding means within the cassette, which means — in a first position — prevent unwinding of the packs of tape and thus hold the magnetic tape taut and — in a second position — release the packs and the magnetic tape for operation in conjunction with guide, scanning and driving means on the recorder. The said holding means are in the form of spring elements which engage teeth in the hubs to prevent the packs from unwinding. In a special embodiment, the holding means are in the form of flat members, one on each side of the packs between the side surfaces thereof and the upper and lower walls of the cassette, individual springs being provided which resiliently support said members relative to the wall of the cassette and permit movement of said members from a first, pack-locking position to a second, pack-releasing position.

7 Claims, 5 Drawing Figures

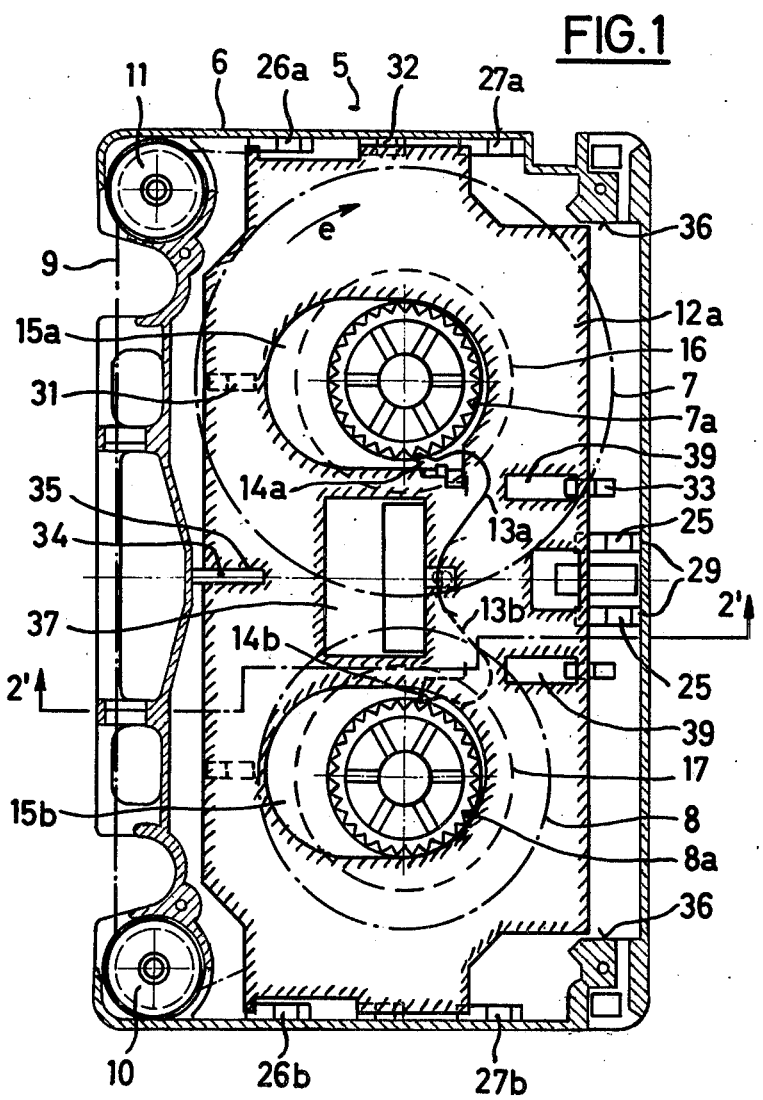

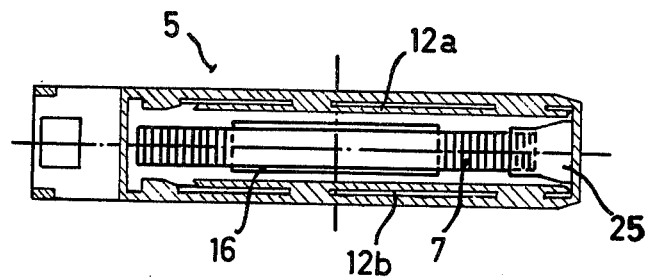
FIG.4
FIG.3
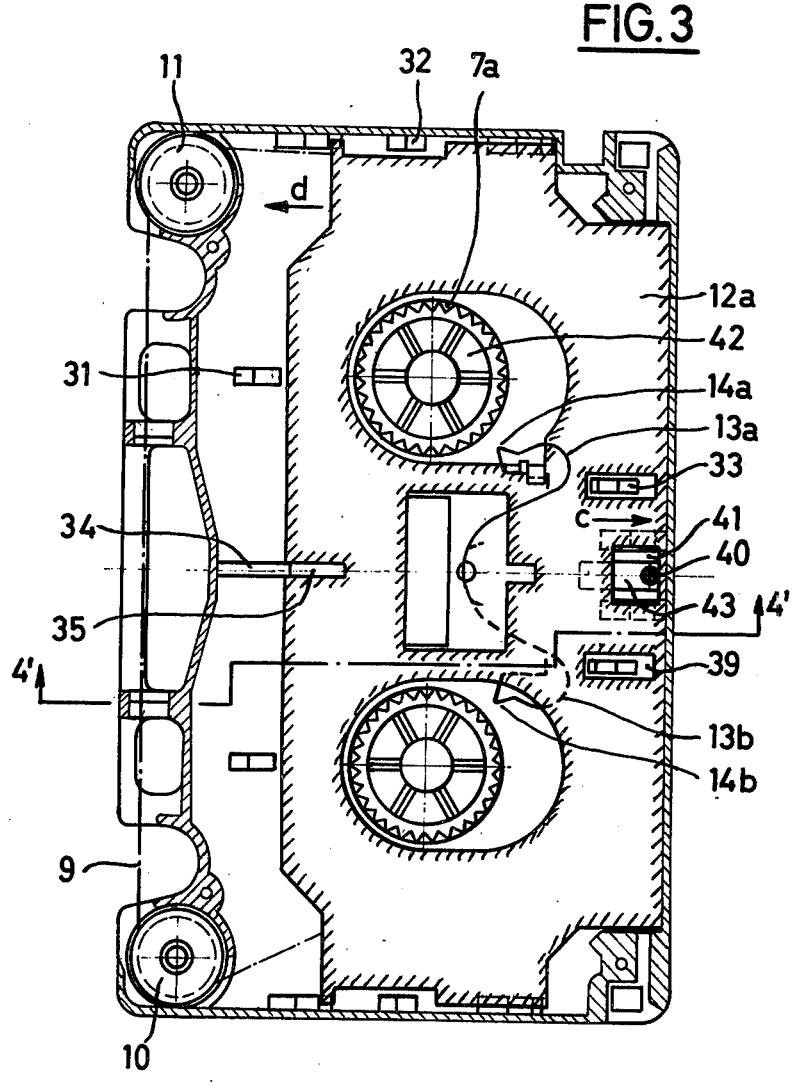

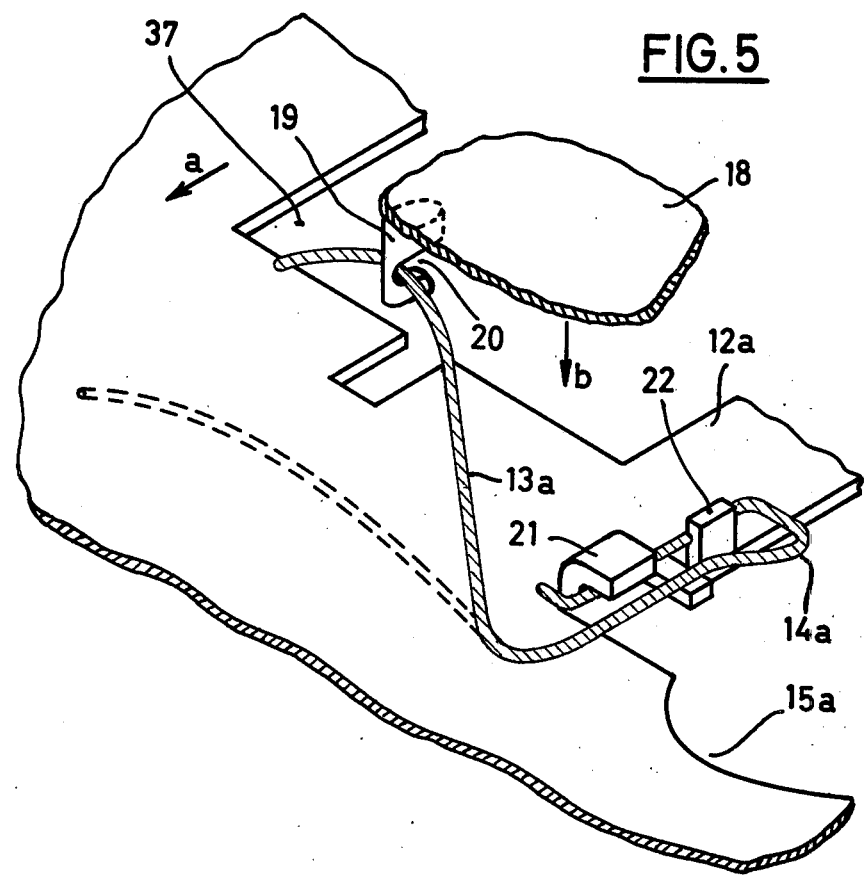

TAPE RECORDER AND MAGNETIC TAPE CASSETTE

This invention relates to a tape recorder with a magnetic tape cassette, the latter consisting of a substantially rectangular housing having a bottom wall, a top wall and side walls and containing one or more hubs adapted to carry packs of magnetic tape, the hubs and magnetic tape being driven by spindles and capstans provided on the tape recorder and adapted to pass through openings in the bottom and/or top walls of the cassette and holes in the hubs, the recording and reproduction of signals after the cassette has been placed in position on the recorder being effected by means of recording or reproducing heads which are provided on the recorder and which, together with at least one pressure roller, are adapted to enter at least one opening in the front wall of the cassette to bear against the magnetic tape passing along said front wall on the inside thereof.

Tape recorders using cassettes enable magnetic tapes to be handled more simply and safely than tape recorders employing reels of tape or tape packs, the handling of which is troublesome and time-consuming and almost inevitably leads to damage to the tape.

The high-quality tape recorders used in the studio or for data processing are very exacting as regards tape pace and tape guidance. Desirably, such equipment should be operable by unskilled personnel without the quality of the recording or playback being impaired.

The prior art includes tape recorders which use reels or packs of magnetic tape and which ensure adquate tape guidance, thus making the recorders suitable for all applications, by the provision of all of the means for guiding and driving the tape in or on the recorder, the magnetic tape being transported between stationary tape guides and magnetic heads. As mentioned above, the disadvantage of such units resides in the time-consuming and difficult handling of the tape, calling for the services of experienced operators.

Cassette recorders are also known, in which the cassettes contain the essential tape guide elements such as the tape guide pins and tape guide rolls, the hub bearings and pressure pads. The cassette housing is usually made of thermoplastics material which is not dimensionally stable to the required high degree when subjected to changes of temperature and humidity, with the result that the tape guide means, which are directly or indirectly connected to the cassette housing, alter their predetermined position relative to the tape so that the position of the magnetic tape relative to the magnetic heads is also changed. The result of such changes in the position of the heads is poor or even useless recordings so that such cassette recorders are not very suitable for studio or data-processing applications.

U.S. Pat. No. 3,800,322 describes a tape recorder and associated magnetic tape cassette, in which pivotable levers are provided within the cassette, by means of which levers the reels are held in a locked position and the tape is kept taut when the cassette is not on the recorder. This type of cassette is very expensive to produce, since the levers must be manufactured to very close tolerances and positioned very accurately inside the cassette in order to avoid impairment of the tape-running properties.

A magnetic tape cassette is also known in which two plates are disposed at a distance from the sides of the reels when the cassette is in position on the recorder but which come into contact with said sides when the cassette is removed from the recorder. The hubs of the reels are provided on each side with concentric outer circles of teeth which cooperate with inner circles of teeth on additional members for the purpose of locking the reels; when the teeth are not in mesh, the reels are free to rotate. The said plates are arranged between the additional members and the reels and their position relative to the sides of the reels changes, due to the shape of said plates, when the said additional members are displaced, i.e. they move into contact with said sides or away therefrom. However, such a cassette design is highly elaborate and therefore very unsuitable for mass-production. Furthermore, the use of meshing teeth for locking the reels makes automatic tautening of the tape in the "reel-locked" state impossible and also makes it impossible to manually eliminate a loop of tape which may have formed at the front of the cassette.

Summarizing, it can be said that prior art cassettes are not capable of meeting the high requirements regarding recording and reproducing quality, unless produced at great expense and in relatively small numbers.

It is an object of the invention to provide, whilst avoiding the aforementioned drawbacks of known magnetic tape recording systems, a cassette which can be mass-produced economically and a tape recorder for use with such a cassette, the combination ensuring optimum guidance of the hubs, tape packs and tape and simplicity of operation with minimum tape damage.

In connection with a tape recorder employing a magnetic tape cassette, the latter consisting of a substantially rectangular housing having a bottom wall, a top wall and side walls and containing one or more hubs adapted to carry packs of magnetic tape, the hubs and magnetic tape being driven by spindles and capstans provided on the tape recorder and adapted to pass through openings in the bottom and/or top walls of the cassette and holes in said hubs, the recoding and reproduction of signals after the cassette has been placed in position on the recorder being effected by means of recording or reproducing heads which are provided on the recorder and which, together with at least one pressure roller, are adapted to enter at least one opening in the front wall of the cassette to bear against the magnetic tape passing along said front wall on the inside thereof, this object is achieved by providing spring means having resilient pawls or catches in the cassette means to lock the hubs and maintain the tape in a plane substantially parallel to the front wall of the cassette after the cassette has been removed from the recoder, which resilient catches cooperate with concentric circles of teeth provided on the hubs and are designed and arranged in such a way that they engage said teeth on the hubs when the cassette is removed from the recorder and prevent the hubs from rotating in the tape unwinding direction, provided the hubs are not rotated from outside, and are spring-biassed in the winding direction such that the hubs can be rotated from outside in both the winding and unwinding directions, and by providing guide elements, driving means and releasing elements on the recorder which enter openings in the cassette housing when the cassette is placed in position on the recorder such that the said spring means are disengaged from the said teeth by means of the releasing elements to allow the tape and hubs to be guided and driven by said guide elements and driving means substantially independently of the cassette housing.

The packs of tape can thus be reliably locked and released. Furthermore, the tape is automatically tautened along the front wall of the cassette. If an undesirable loop of tape should for some reason form at the front of the cassette, the arrangement and design of the spring means make it possible to tauten the tape manually.

In an advantageous embodiment of the invention, the spring means each consist of at least one spring disposed between the cassette wall and a flat member slidably located above and below the packs of tape.

Such a design makes it possible for the springs and flat members to perform a number of functions.

In a further embodiment of the invention, each of the springs is mounted between the flat member associated therewith and the cassette wall in such a manner that the said flat member is resiliently supported and slidably movable in a direction perpendicular to the cassette wall associated therewith and in a plane which is substantially parallel to said cassette wall.

It is preferred to use a simple type of spring which exerts a force both in the plane of its windings and also perpendicularly thereto.

In a further embodiment, at least one of the flat members has apertures for the admission of driving means and releasing elements provided on the recorder. These apertures can be readily produced when the flat members are manufactured by punching without there being any need for additional and expensive machining.

In an advantageous embodiment of the cassette of the invention, the flat members are held in position between the top and bottom walls of the housing in spatial relationship to said walls, and the sides of the hubs by means of projections, and are mounted for slidable movement in a plane substantially parallel to the top and bottom walls of the housing. This means that the two parts of the housing may be manufactured as identical injection moldings and the flat members may be simply inserted therein when the cassette is assembled.

In a further advantageous embodiment of the invention, each of the flat members is — in a first position — held in contact with the side faces of the hubs and is — in a second position, when the cassette is in position on the recorder — at a distance from the said side faces. In the said first position, the hubs and packs of tape are held in a specific position between the top and bottom walls of the cassette housing before the cassette is placed on the recorder, thus ensuring that the spindles can reliably engage the hubs when the cassette is placed in position on the recorder.

In yet another advantageous embodiment of the cassette of the invention, each of the springs is securely attached to the flat member and cassette housing by fastening means.

In another simple embodiment, each of the springs has a cam-like catch for cooperation with the teeth on one side of each of the hubs, which catches project into the apertures in the flat members serving to admit the driving means.

In an even further advantageous embodiment of the invention, each of the flat members held in its first position in contact with the side faces of the hubs, when the cassette is not on the recorder, only by the spring and ramp-like projections.

Finally, according to the present invention the releasing elements consist essentially of a pin provided on the recorder and adapted to pass through further openings in the cassette housing and a further aperture in each of the flat members when the cassette is placed on the recorder, which pin may be caused to execute a movement by actuating means on the recorder, as a result of which the flat members are shifted from their first position to their second position. It is a simple matter to produce reliably pin-actuating means of this kind, and this feature is thus equally suitable for mass-production.

In a particularly advantageous embodiment of the cassette of the invention, each flat member has a substantially rectangular opening and projections are provided on said flat members near said openings for receiving one end of the spring, the other end of the spring being of such a length and shape that it can be hooked over the edge of said opening, prior to assembly of the cassette, to prevent it being lost.

As a result, insertion of the flat members and securing of the springs can be effected extremely simply and quickly.

Further details of the invention are disclosed in the following description of one embodiment of the invention illustrated in the accompanying drawings, in which FIG. 1 is a diagrammatic representation of a cassette of the invention with the tape packs in the locked position, FIG. 2 is a cross-section through the cassette of FIG. 1, taken along the line 2'—2', FIG. 3 shows a cassette as illustrated in FIG. 1 but with the tape packs freely rotatable, FIG. 4 is a cross-section through the cassette of FIG. 3, taken along the line 4'—4', and FIG. 5 is a perspective view of parts of the cassette showing means for mounting the spring.

FIG. 1 shows a cassette 5 having a bottom wall 6, tape packs 7 and 8, a tape loop 9, guide rollers 10 and 11, plates 12a and 12b and springs 13a and 13b and also teeth 7a and 8a.

The springs 13a and 13b have pawls or catches 14a and 14b (see FIG. 1) which project into apertures 15a and 15b in plates 12a and 12b and can thus engage the teeth 7a and 8a on the hubs 16 and 17.

FIG. 2 clearly shows the position of the plates 12a and 12b relative to the bottom and top walls of the cassette and relative to the tape pack 7 and the hub 16. In this state, the plates 12a and 12b are pressed against the side faces of the hubs 16 and 17. This ensures that the tape packs 7 and 8 are automatically located in about the center plane of the cassette 5. The compressive forces are produced by the spring 13a for the upper plate 12a and spring 13b for the lower plate 12b. As is clearly shown in FIG. 5, each spring is mounted between wall 18 (or 6) and plate 12a (or 12b) and may be conveniently secured by means of a pin 19 attached to the wall 18 (6), which pin is provided with a notch 20, and lugs 21 and 22 integral with the plate 12a (12b). Other methods of mounting the spring are possible, but it is necessary to ensure that the spring can be quickly placed in position during cassette manufacture and that it remains in position once it has been mounted. The directions of force exerted by the spring 13a, which may for example be made of inexpensive spring steel wire, are indicated by the arrows $a$ and $b$ (cf. FIG. 5). The force $K_a$ urges the plate 12a into its first position as shown in FIG. 1, whilst force $K_b$ affords resilient support of the plate 12a relative to the top wall 18. The relaxed spring 13a is indicatd by broken lines in FIG. 5.

In FIG. 2, the plates 12a and 12b are in their first position in contact with the sides of the hubs (of which only hub 16 and tape pack 7 are visible). The plates 12a and 12b should be of such dimensional stability and be so mounted on the projections 23 that the side faces of the tape packs 7 and 8 are not contacted thereby, since such contact could lead to damage of the edges of the tape. The projections 23, which have at least one sloping surface and one support surface each, are integrally molded on the bottom and top walls 6 and 18 symmetrically with respect to the center plane 28 of the cassette 5. On the back wall 25 of the cassette 5 there are provided, on the bottom half, projections 25 which have two pairs of support surfaces and two pairs of sloping surfaces. One pair of support surfaces and one pair of sloping surfaces are associated with the plate 12a, the other pairs of surfaces being associated with plate 12b. Projections of similar shape are provided on the side walls of the cassette 5 and are designated by 26a and 26b and 27a and 27b. Unlike the projections 26 and 27, the projections 25 carry lugs 29 which engage openings 30 in the top half of the cassette to effect simple closure of the housing halves.

Further projections 31 to 33 are provided on the bottom half of the cassette and symmetrically located counterparts are provided on the top half, which projections act as points of support and ramps for the plates 12a and 12b. Furthermore, a guide member 34 which cooperates with a guide slot 35 in each of the plates 12a and 12b is provided in the center of each housing half.

When the plate is inserted into the housing half, the slot 35 engages the member 34 such that the rear corners of the plate are positioned between the edges 36 of the housing half. The appropriately shaped free end of the spring 13a, which was previously hooked over the edge of the substantially rectangular opening 37 in plate 12a, is then released so that it engages the notch 20 on the pin 19 (FIG. 5); in this position spring 13a is under initial tension. In addition to the aforementioned openings in the plates 12a and 12b, there are also provided substantially elliptical apertures 15a and 15b for the admission of the teeth 7a and 8a, and rectangular openings 39 for the projections 33. Whereas FIGS. 1 and 2 show the state of the cassette 5 after it has been removed from the recorder, in which state the spring catches 14a and 14b engage the teeth 7a and 7b, FIGS. 3 and 4 illustrate the state of the cassette 5 when in position on the recorder. In the latter case, a pin 40 has passed through a slot 41 in the cassette housing and entered an aperture 42 in each of the plates 12a and 12b. By means of suitable actuating means on the recorder, the said pin 40 has been moved in the direction of arrow c to the position shown, in which the hubs and packs of tape have been released by the plates 12a and 12b. The spring catches 14a and 14b now no longer engage the teeth 7a and 8a.

FIG. 4 shows the considerable distance between the plates 12a and 12b and the hub 16 and pack 7. In this position, it is assumed, of course, that the drive spindles (not shown) on the recorder have already engaged the openings 42 in the hubs. In this state of the cassette (FIG. 3), the guide rollers 10 and 11, which in FIG. 1 are loosely located in the cassette housing, have now been positioned by means of idlers on the recorder which have entered the bores in said guide rollers. As a result, the rollers 10 and 11 are now in the correct position for guidance of the tape. Tape guidance is therefore mainly effected by means on the recorder.

It may be mentioned at this point that, as will be evident from the almost identical openings provided in the cassettes, particularly along the front wall thereof, the relevant parts of the recorder to be used in connection with the cassette according to the invention are of a design substantially like that disclosed in above referenced U.S. Pat. No. 3,800,322.

Movement of the plates and packs of tape, as occurs when the plates are returned from the position shown in FIGS. 3 and 4 to that illustrated in FIGS. 1 and 2, will now be discussed. The direction of movement of the plates is indicated in FIG. 3 by arrow d. Movement of the plates 12a and 12b occurs when the pin 40 is moved in the opposite direction to that indicated by arrow c.

When the tip of the spring catch 14a touches the teeth 7a, the position and shape of the spring catch is such that a component of force is applied to the teeth and consequently to the pack 7, thus causing the latter to turn through an angle of from 5° to 8° in the winding direction (arrow e). The other hub 17 and pack 8 are caused to rotate to a similar extent in the opposite direction by the spring catch 14b. The tape 9 is thus automatically tautened along the front of the cassette 5 when the latter is removed from the recorder. If, for some reason, tension on the tape is relaxed, thus causing a loop of tape to form at the front of the cassette, the tape can be easily retautened by turning hub 16 in the direction of arrow e by hand. By turning said reel in the opposite direction it is possible to reduce the tension on the tape, i.e. to loosen the tape.

It is surprisingly simple, as a result of choosing an appropriate spring tension and appropriately positioning the spring, to wind and unwind the tape with the spring catches 14a and 14b in the engaged position.

In the embodiment described above, the springs 13a and 13b consist of spring steel wire having a thickness of 0.7 mm. It will be appreciated that the springs, plates and projections must be of the same shape and arranged in the same manner on each half of the cassette housing, so that the cassette can be used on both sides. In the case of a cassette to be used on one side only, it is of course possible to use only one plate with one or two spring catches, provided that the upper half of the cassette housing has been suitably designed.

We claim:

1. In a magnetic tape cassette which comprises a substantially rectangular housing having a bottom wall, a top wall, a front wall and side walls and containing
    a pair of hubs each provided with a circular toothed portion and adapted to carry packs of magnetic tape, said bottom and/or top walls having therein apertures at least some of which are disposed to accommodate the drive spindles and capstans of a tape recorder, said front wall having therein at least one opening for accommodating tape-scanning means and at least one pressure roller carried by said tape recorder, said opening being arranged so that said pressure roller bears against the length of tape passing along the front wall of the cassette and on the inside thereof;
    resilient means; and
    control means movable against the action of said resilient means in a plane substantially parallel to the cassette plane, between a first, off-recorder position in which said control means rendor said length of tape taut along said front wall and clamp said hubs in place, and a second, on-recorder in which said control means release said length of tape as well as said hubs; the improvement that said bottom and top walls of the cassette housing are provided with cam portions; and that said control means include two slide plates each having an actuating portion engageable through one of said apertures and each having secured thereto a pawl disposed in cooperating relationship with the circular tooth portion of one of said hubs, said plates substantially overlying opposite sides of the two hubs and being yieldingly urged against the cam portions of said bottom and top walls, respectively, for longitudinal sliding movement on said cam portions, in a direction perpendicular to said front wall, between said first and second positions, such that said plates, as they are slidably moved by said actuating portion from their first to their second positions, impart by way of said pawls, a rocking movement to the circular toothed portions of the corresponding hubs, thereby to render said length of tape taut, and in riding up on the respective cam portions incident to their sliding movement, are displaced in a direction substantially perpendicular to the cassette plane, thereby to clamp said hubs between them.

2. In a magnetic tape cassette the improvement as claimed in claim 1 and wherein said plates substantially overly the corresponding sides of said packs and have cut-outs for accomodating said hubs and for providing access to said actuating portions.

3. In a magnetic tape cassette the improvement as claimed in claim 1 wherein said resilient means comprise two springs each attached at one end to the respective slide plate and at the other end to the respective one of said top and bottom walls, and each said spring being shaped to provide a corresponding resilient pawl.

4. In a magnetic tape cassette the improvement as claimed in claim 3 wherein each said spring is disposed in the space between the respective slide plate and the respective one of said top and bottom walls, in such a way that said spring also tends to urge said plate into contact with the cam portions of the respective wall.

5. In a magnetic tape cassette the improvement as claimed in claim 3 wherein said pawl is of a design such that said pawl is pressed against and into the teeth of the circular toothed portion of the corresponding hub with a force and by an amount such as to permit said hub to be rotated by hand, from outside of said cassette, both in the winding and unwinding direction.

6. In a magnetic tape cassette the improvement as claimed in claim 3 wherein each of said top and bottom walls has a substantially rectangular opening; wherein there is provided on each said wall near said opening a notched projection; and wherein each said spring is of such a length and shape that it can be hooked over said projection.

7. In combination, a tape recorder and magnetic tape cassette;

said recorder comprising at least one driving capstan and one pressure roller, a pair of spindles, tape scanning means, and a cassette-releasing element; and said cassette comprising a substantially rectangular housing with a bottom wall, a front wall and side walls and containing a pair of hubs each provided with a circular toothed portion and adapted to carry packs of magnetic tape, said bottom and/or top walls having therein apertures at least some of which are disposed to accommodate said spindles and said capstan, said front wall having therein at least one opening for accommodating said tape-scanning means and said pressure roller, said opening being arranged so that said pressure roller bears against the length of tape passing along the front wall of the cassette and on the inside thereof, resilient means, and two slide plates each having an opening engageable by said releasing element through one of said apertures so as to move said plates against the action of said resilient means, in a plane substantially parallel to the cassette plane, between the first off-recorder position in which said plates cause said hubs to be substantially held in place, and a second, on-recorder position in which said plates cause said hubs to be released, said resilient means including two springs each attached to the corresponding slide plate and the top and bottom wall, respectively, of the cassette, and each having formed thereon a resilient pawl which engages the circular toothed portion of the corresponding hub in said first, off-recorder position of said plate to prevent the corresponding hub, in the absence of external rotating forces acting on said hub, from turning in the tape unwinding direction, and each said spring being of a design such as to permit said hub to be rotated from the outside of the cassette, in both the winding and unwinding directions.

* * * * *

UNITED STATES PATENT AND TRADEMARK OFFICE
CERTIFICATE OF CORRECTION

PATENT NO. : 4,029,268
DATED : June 14, 1977
INVENTOR(S) : Klaus Schoettle et al It is certified that error appears in the above–identified patent and that said Letters Patent are hereby corrected as shown below:

Column 6, line 67, "rendor" should read --render--.

Column 7, line 1, after "on-recorder" insert --position--.

Column 7, line 30, "accomodating" should read --accommodating--.

Signed and Sealed this

Twenty-first Day of March 1978

[SEAL]

Attest:

RUTH C. MASON
Attesting Officer

LUTRELLE F. PARKER
Acting Commissioner of Patents and Trademarks